March 17, 1964 S. MENDELL 3,124,885
GRAPHICAL CHART DISPLAY
Filed Feb. 12, 1962 3 Sheets-Sheet 1
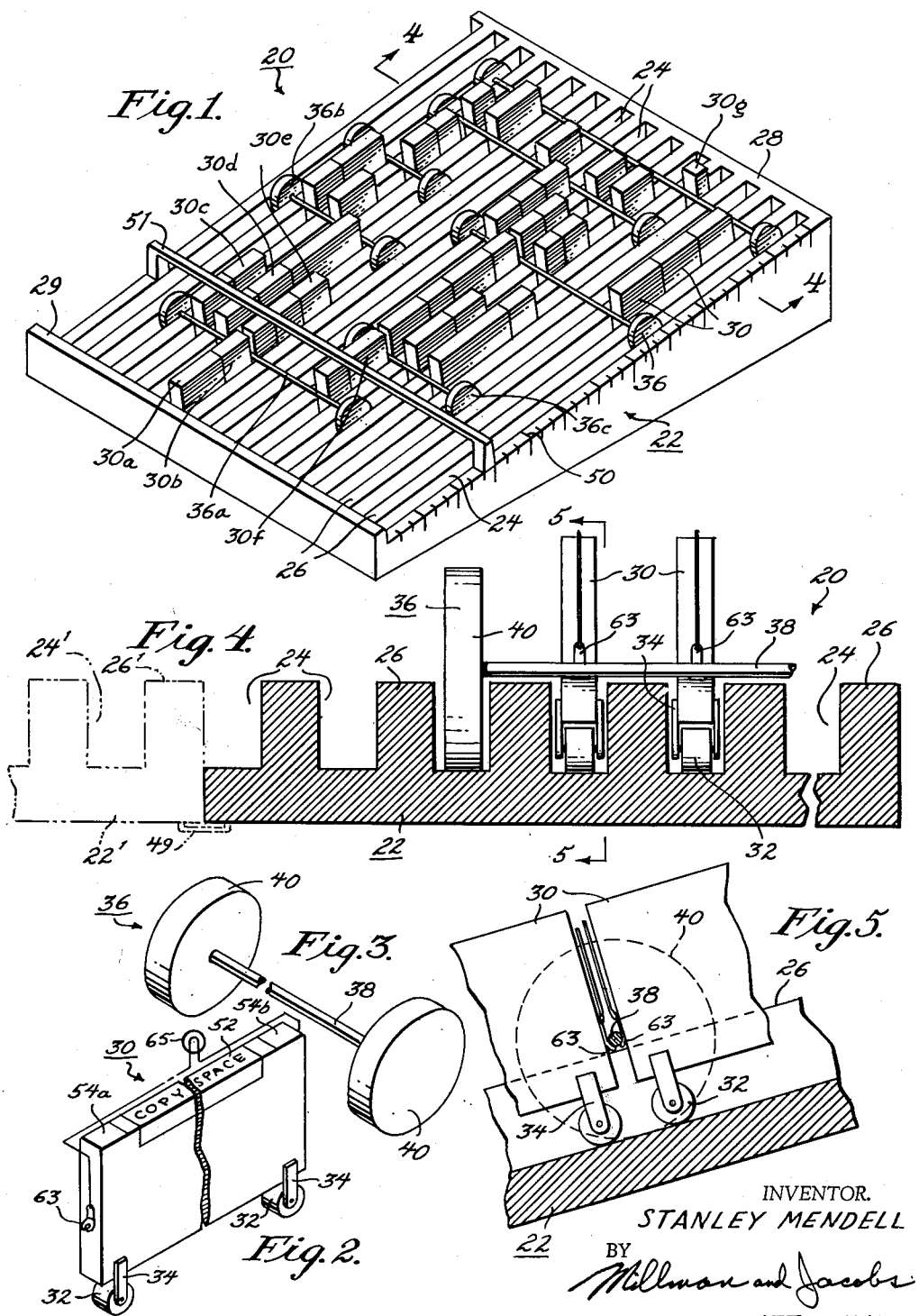
INVENTOR.
STANLEY MENDELL
BY
Millman and Jacobs
ATTORNEYS.

March 17, 1964  S. MENDELL  3,124,885
GRAPHICAL CHART DISPLAY
Filed Feb. 12, 1962  3 Sheets-Sheet 2
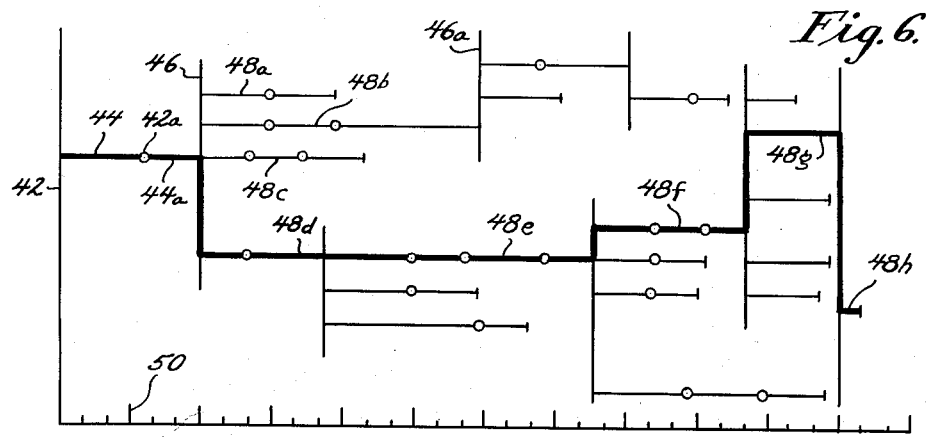
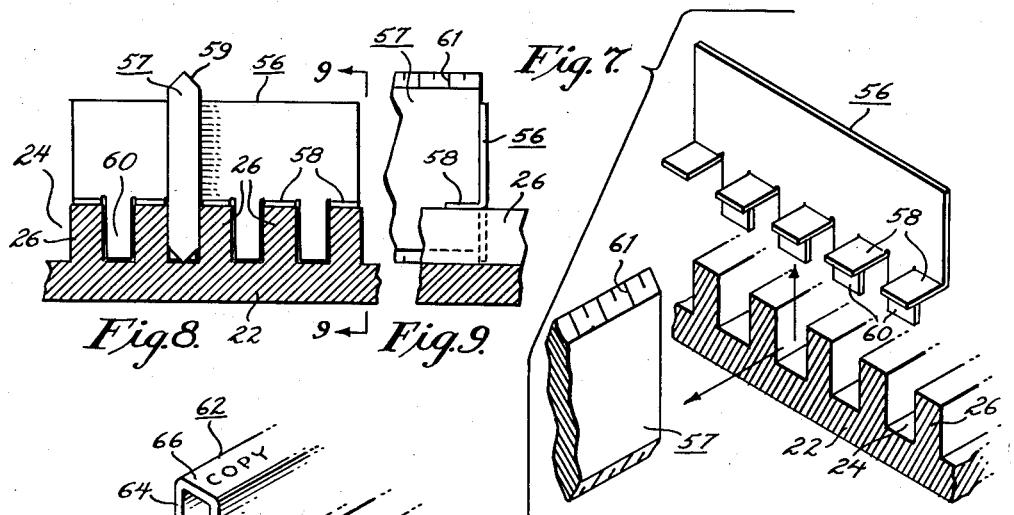
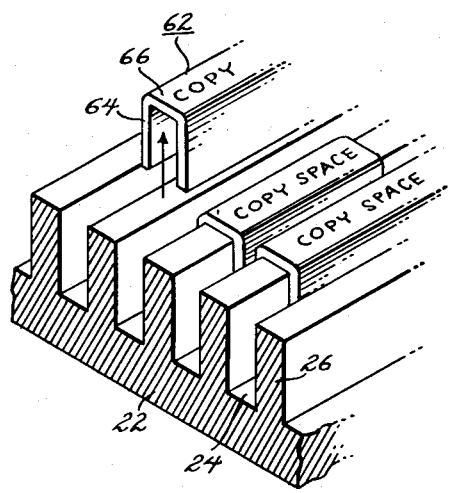
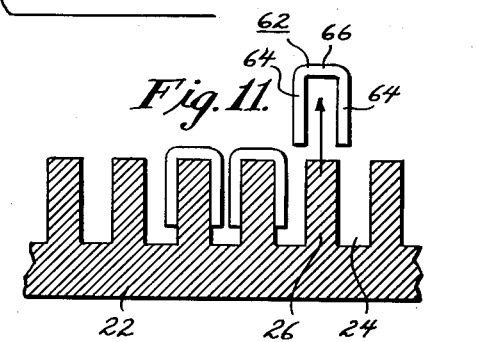
INVENTOR.
STANLEY MENDELL
BY
ATTORNEYS.

March 17, 1964     S. MENDELL     3,124,885
GRAPHICAL CHART DISPLAY
Filed Feb. 12, 1962     3 Sheets-Sheet 3
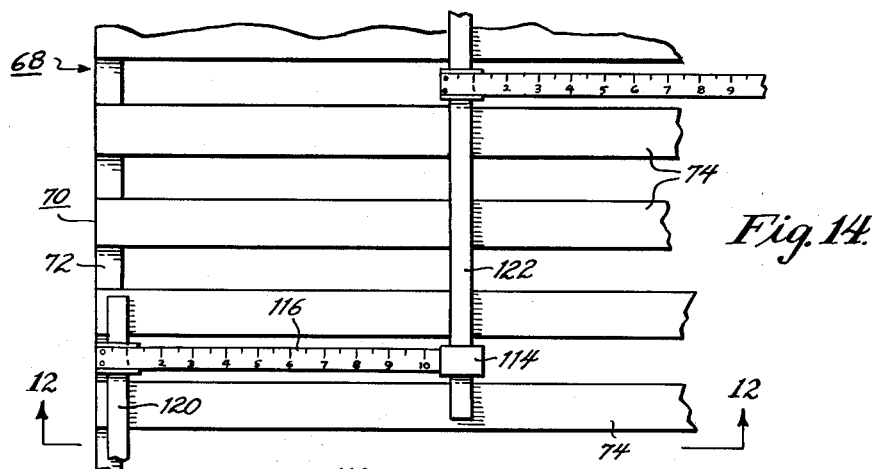
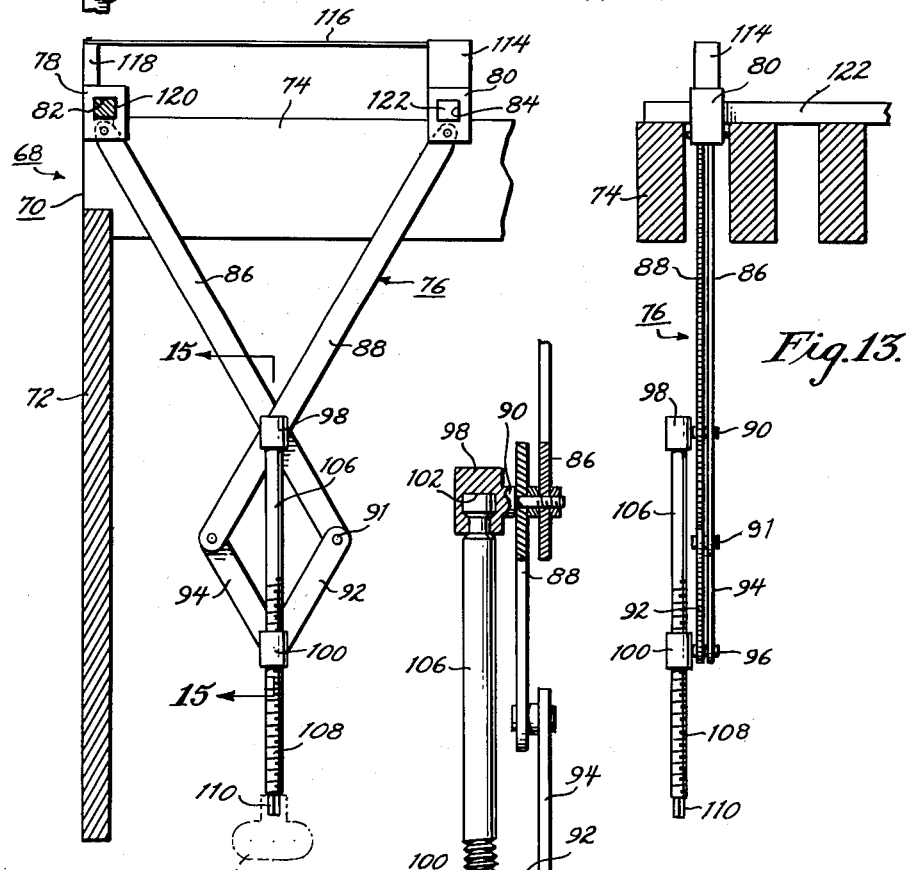
INVENTOR.
STANLEY MENDELL
BY Millman and Jacobs
ATTORNEYS.

United States Patent Office 3,124,885
Patented Mar. 17, 1964

3,124,885
GRAPHICAL CHART DISPLAY
Stanley Mendell, Haddonfield, N.J., assignor to Management Studies, Inc., a corporation of New Jersey
Filed Feb. 12, 1962, Ser. No. 172,671
15 Claims. (Cl. 35—24)

The present invention relates to a graphical chart system, and more particularly to a graphical chart device and system for display of and use in the planning, scheduling, and managing of work and production programs.

Analytical techniques for planning, scheduling, and managing large work and production programs have been developed; among these are mathematical and statistical analysis techniques known as the "Critical Path Method" and the "Program Evaluation and Review Technique" (PERT). The problems handled with these techniques are of such complexity that they often require a digital computer to solve them and involve complex graphs to illustrate them; see, e.g. the article "Critical-Path Planning and Scheduling: Mathematical Basis" by J. E. Kelley, Jr., in the publication "Operations Research," 1960, pp. 296–320.

These programs include a number of series-related events, and between two series events, a work or production activity is performed to carry the program forward. The programs also include a number of events, the activities of which can be carried out concurrently or in parallel. Each network of parallel-related events and activities may include a plurality of series-related events and additional parallel-related events. This relationship between the various events of a program permits the use of a graphical representation of the program to analyze it. Such a graphical representation presently in use consists of a plurality of dates or small circles representing the various events which are connected by series or parallel-related lines (the latter converging to or diverging from a nodal event) representing the activities to carry out the events. Each line may be marked with a number indicating the length of time required to carry out the activity.

This type of graphical representation of a program has a number of advantages. It provides the planner with a picture of which activities can be carried out concurrently or in parallel, and which activities must wait until the previous activities are completed. Also, it provides an advance approximate time schedule for the various activities so that the planner can schedule the purchase of various materials, equipments, etc. which may be required, and the utilization of various types of skilled personnel. For the parallel activities, the planner can determine which activity will take the longest time and attempt to expedite such activity or activities if possible. A major advantage is that with such an analysis of the program, it is possible to determine the overall time for carrying out the program. This is achieved by tracing a path from the first event or origin of the program to the last event or terminus along the activity lines of the longest duration. Such a path is known as the "critical path" and the total of the durations of the activities covered by the critical path is the time required to complete the program. Each of the lines making up the critical path may itself be considered a critical path of a subordinate part of the overall program.

Although this technique for analyzing large programs has many advantages, the graphical representation of large programs is often very complex, expensive, and slow to prepare. Such graphical representations are often difficult to follow and cumbersome to use. Also, it is relatively difficult to make changes in this type of graphical representation to correspond with advance changes in the program or changes which may occur as the program advances.

It is among the objects of the present invention to provide a new and improved graphical chart display.

Another object is to provide a new and improved graphical chart display for use in the planning, scheduling, and managing of large programs.

Another object is to provide a graphical chart device which provides a clear display of the various events and activities of a program and the relation between such events and activities.

Another object is to provide a graphical chart device for displaying the various events and activities of a program which automatically provides the critical path of a program or a part thereof as well as a measurement of its time span.

Another object is to provide a graphical chart device for displaying the various events and activities of a program which is readily adjustable to permit any desired revision in the program.

Another object is to provide an adjustable graphical chart device for displaying the various events and activities of a program which can be reproduced pictorially at various stages in the program to determine the progress being made, or for use in planning future programs.

Another object is to provide a graphical chart display for use in planning, scheduling, and managing large programs which is inexpensive and can be assembled easily and quickly.

In accordance with this invention, means are provided to represent the various activities of a program; these means are supported in various series and parallel relations according to the sequence of the activities of the program, and means are provided for indicating the junction points of parallel related activities.

An embodiment of this invention is featured by a plurality of gauge elements to represent the time duration of activities of a program. Parallel path means position the gauge elements in various series and parallel relations. A plurality of fences are adapted to be positioned perpendicular to the parallel paths to provide junction indications of gauges in parallel paths.

The foregoing and other objects of this invention, the various features thereof as well as the invention itself, may be more fully understood from the following description when read together with the accompanying drawing, in which:

FIG. 1 is a perspective view of one form of the graphical chart display device of the present invention;

FIG. 2 is a perspective view of an activity time element for use on the graphical chart display device of FIG. 1;

FIG. 3 is a perspective view of a junction point or node marker for use in the graphical chart display device of FIG. 1;

FIG. 4 is a sectional view taken along line 4—4 of FIG. 1;

FIG. 5 is a sectional view taken along line 5—5 of FIG. 4;

FIG. 6 is an idealized graphical representation of the display provided by the device of FIG. 1 or FIG. 7;

FIG. 7 is a perspective exploded view showing a modification of a junction marker for use on the graphical chart display of the present invention;

FIG. 8 is a sectional view similar to FIG. 4 showing the fence of FIG. 7 mounted on the graphical chart display board;

FIG. 9 is a sectional view taken along line 9—9 of FIG. 8;

FIG. 10 is a perspective view showing a modification of the gauge for use on the graphical chart display of the present invention;

FIG. 11 is a sectional view similar to FIG. 10 showing the gauge of FIG. 10 mounted on the display board;

FIG. 12 is a longitudinal sectional view of a portion of a modification of the graphical chart display of the present invention;

FIG. 13 is a transverse sectional view of the modification of FIG. 12;

FIG. 14 is a top plan view of a portion of the modification of FIG. 12; and

FIG. 15 is a sectional view taken along line 15—15 of FIG. 12.

In the drawing corresponding parts are referenced by similar numerals.

Referring initially to FIGS. 1 and 4, the graphical chart display device of the present invention is generally designated as 20. The chart display device 20 comprises a board 22 having a plurality of spaced, parallel channels 24 cut in one surface thereof, and extending along the length of the board. The channels 24 are of uniform width and depth, and are uniformly spaced apart to provide a plurality of spaced, parallel ribs 26 therebetween, which are perpendicular to the back and front sides 28 and 29. As shown in FIG. 1, the side supports of the board 22 are constructed so that the top surface of the board 22 is inclined with the back side 28 higher than the front side 29. However, if desired, the board 22 can be constructed so that the top surface of the board is level. The board 22 may be of any desired length or width to accommodate large or small displays.

The graphical chart display device 20 utilizes a plurality of gauges, one of which is generally designated as 30 in FIG. 2. Gauge 30 is a rectangular block of wood, plastic, or the like (and other shapes, such as that of a diamond cross-section, as shown in FIG. 7, may be used). The width of the gauge 30 is slightly narrower than the width of the channels 24 in the board 22, and the height of the gauge is greater than the depth of the channels 24. The lengths of the gauges 30 vary, for example, in accordance with a time scale that is used. Each of the gauges 30 is mounted on a pair of wheels 32 which are rotatably supported between legs 34 secured to and extending below the gauge 30 adjacent the ends thereof.

A plurality of fences, one of which is generally designated as 36 in FIG. 3, are used as junction point markers. Fence 36 comprises a rigid rod 38 of small diameter having a separate circular disc 40 secured to each end thereof. The discs 40 are each of a thickness slightly less than the width of the channels 24 in the board 22, and are of a radius greater than the depth of the channels.

The schedule of a program is displayed by setting up the gauges 30 in the channels 24. A variety of different lengths of gauges are provided to represent different time durations. The fences 36 are mounted with the discs 40 in the channels and the rods 38 extending transversely across the channels. The fences rest against one or more of the preceding or lower gauges and serve as a stop or fence for the succeeding or upper gauges. A variety of different lengths of fences are provided.

A graphical representation of the analysis of a program represented by the board set up of FIG. 1 is shown in FIG. 6. The vertical line 42 at the left hand side of FIG. 6 indicates the first or origin event of the program (representing front side 29). The horizontal line 44 extending from the starting or origin event 42 (representing gauge 30a) indicates the first activity performed from the origin event 42. The small circle 42a indicates the second event of the program, that is, the completion or terminus of the activity 44 and the start of activity 44a. The horizontal line 44a extending from the event 42a (representing gauge 30b) indicates the second activity performed seriatim after the first 44. The length of the activity lines 44 and 44a (and of the others) are proportional to the length of time or duration of the activities 44 and 44a. Thus, activity line 44 is longer than activity line 44a to indicate the relative times of the activities.

The graph of FIG. 6 may be construed as a plan view of the device of FIG. 1 (or FIG. 7), and the little circles suggest the spaces between gauges. This graph of FIG. 6 may also be construed as a pictorial reproduction of the device obtained in a manner described below.

The vertical line 46 at the end of activity line 44b represents the terminus thereof and also the start of the next event to be carried out, and it is a junction point or node marker (corresponding to fence 36a). A junction point or node is an event at which two or more activities or group of activities which can be carried out concurrently or in parallel either begin or end. From the junction point or node 46 extend four branches 48a, 48b, 48c, and 48d (corresponding to the four groups 30c, 30d, 30e, 30f of gauges in FIG. 1). Each of the branches may include either a single activity, or as shown in FIG. 6, two or more serial activities. The activities in branches 48a, 48b, and 48c take place generally concurrently or in parallel.

The branches 48a, 48b, and 48c all extend toward the same junction point or node indicated by the vertical line 46a (see fence 36b in FIG. 1). Thus, the activities of these three branches are all completed before attaining the event indicated by the junction point 46a. However, as can be seen, the activities of branch 48b require more time to be completed than the activities of the branches 48a and 48c. The activities of branches 48a and 48c are completed before the event 46a is attained, and these branches are called, for convenience, "slack paths," and the time from the completion of these slack-path activities and the node 46 (which is the start of the next activity) is known as "slack time." In the manner just described, the remaining events and series and concurrent activities are illustrated by series and parallel-related lines connected at various junction points until the final or terminal event of the program is reached.

In use, a program schedule may be set up directly on the display device of FIG. 1. Initially, the program is analyzed to determine the various activities that are needed; the time span for each activity; which activities can be performed concurrently; and which activities can be started only after the completion of other activities.

A simplified example may be the program for the manufacture of certain electronic system equipment. The first activity (represented by gauge 30a) may be to set forth and define general objectives of the program. The second activity (gauge 30b), started after the first is completed, may be to design the overall system. Then, starting with fence 36a, four activities may be initiated concurrently (gauge branches 30c, 30d, 30e, 30f) which represent, for example, the work of drafting, electronic circuit design, component design, and mechanical design, respectively. Each of these branches may, in turn, represent a plurality of serial events (as indicated by the gauges thereof). The completion of the circuit design, branch 30d, which is the longest activity of the three branches 30c, 30d, 30e, is a node represented by fence 36b. The latter 36b also represents the start of the next group of concurrent activities related, say, to certain initial production activity and to the ordering or fabrication of components. Similarly, the completion of the mechanical design activities in branch 30f is represented by fence 36c, which also is the starting point for another group of concurrent activities. Ultimately, the equipment is fabricated and assembled in an overall system, and the testing activity (gauge 30g) is performed representing the end of the program. The end of gauge 30g represents the ending event of the program.

When finally assembled, the display device 20 presents graphically the entire program. The assembly of the gauges and fences is quickly performed, and the gauges and fences are readily positioned since they tend to roll down to their proper positions toward the starting side 29. The time span for the overall program, from the starting event 29 to the terminus of gauge 30g, is the time for completion of the overall program. This time span is indicated by the linear scale 50 along the side rib 26 (and, if desired, along each of the ribs 26) of the board parallel to the channels, which is the same scale as that used for the gauge lengths. For example, a week may be represented by a quarter-inch.

An important characteristic of the program is automatically displayed by the device 20 when assembled; that is, the "critical path" of the program. The critical path is the series of activities that determine the overall duration of the program; it can be traced through the graphical representation of FIG. 6 from the starting to the ending events via that activity line of each parallel group that is the longest one. Thus, the critical path of FIG. 6 is that activity line path via lines 44, 44a, 48d, 48e, 48f, 48g, 48h. It is that path providing an unbroken connection of activity lines from the beginning to the ending events. If there is more than one critical path, it is indicated in the same manner.

The critical path may be traced in the device 20 along the gauges 30 and fences 36 in a similar fashion. The critical path follows the branches in which there is no slack time; for convenience, such branches are called critical sub-paths.

If the program is so complex as to require more area than provided by a single board 22, a second board 22', illustrated in phantom in FIG. 4, is placed against a side of the board 22 to provide additional area. The boards 22 and 22' are constructed with a rib 26 and 26' along one side and a channel 24 along the other to facilitate matching of the boards. U-shaped fasteners 49 are provided for bridging the bottoms or sides 28, 29 of the boards 22, 22' to connect them together. Moreover, the fences 36 that lie in channels of the two boards hold them together.

When all of the gauges 30 and fences 36 are properly placed on the board 22, a clear graphical picture of all the events and activities of the program is displayed as well as their relationships. Since the gauges 30 are of a length corresponding to the duration of the activities they represent, the distance along the scale 50 from the starting side 29 against which the origin gauge 30 seats to the end of the terminal gauge 30g measures the total duration or critical path of the scheduled program.

The scale 50 also permits one to measure the duration of any portion of the program including the critical-path and slack branches and the slack time. The linear scale intervals may represent any desired time interval appropriate to the program to be displayed. Although the rods 38 of the fences 36 have a thickness which adds to the total duration of the program, such thickness of each of the rods 38 is small and can be disregarded considering the overall length of the critical path of the program and the fact that the data used to analyze the program is ordinarily only approximate. Moreover, if desired, notches (not shown) may be provided in the ends of the gauges 30 to receive the fence rods 38. Thereby, any effect of the thickness of the rods on the duration measurements is eliminated.

The gauges 30 are fabricated in different colors to represent different departments of a plant, different skills of workers, different processes that may be performed, etc. Thus, the display device 20 provides the user with a clear picture of which departments and personnel will be required, and when, so as to permit advance planning for their use. Also, the display device 20 shows which departments and personnel have slack time so that the planner will know in advance when such departments and personnel can be used for other programs. This detailed information for the critical-path activities enables the planner to study those activities with the view of using personnel or equipment more effectively so as to shorten the critical sub-paths and, thereby, the overall critical path. For the purpose of analyzing what activities are concurrent at any program time, a straightedge 51 is placed across the gauges parallel to the fences, and the information is immediately available. The straightedge 51 may also be used to demark the finished program from that still scheduled. The straightedge 51 may be a relatively rigid rod or a flexible string; it may also be permanently attached to the board 22 by means of links that are slidably fixed to the sides of the board and slideable therealong parallel to the channels 24 so that it may be moved up or down the board to a position representing any desired time of the program.

As shown in FIG. 2, the top surface of each of the gauges is flat and is provided with a space 52 in the middle thereof which may be used to identify the particular activity represented by the gauge. This identification may be in the form of a color, numeric, word, or alphabetic code; the code may be formed in the manufacture of the gauges, or a space may be left for the user to insert his own code. This space 52 may also be used to provide additional information, such as the number of personnel involved in the particular activity. At the ends of the top surface of the gauge 30 are provided areas 54a and 54b which can be used to identify, say by a numeric code, the beginning and end events of the particular activity represented by the gauge. Thus, each gauge not only indicates a particular activity and its duration, but also shows the beginning and end events of the activity, the number of personnel required to carry out the activity, and the department or type of personnel or equipment required to carry out the activity. References may thereby be made to charts for more detailed information.

The graphical display device 20 of the present invention not only provides a clear picture of the overall program, but also permits ease of adjustment of the various activities. Thus, after the program has been completely laid out, the planner can review his analysis to determine whether the program can be improved by varying the order of any of the activities, by reducing the duration of any of the critical-path activities, or, if more efficient, by increasing the duration of any of the slack-branch activities. If the planner determines that any such variations can be made, such as a reduction or increase of the duration of any activity, he merely removes the gauge 30 representing such activity, and replaces it with a gauge of shorter or greater length. The changing of any one gauge 30 does not affect the relative positions of the other gauges, since only the gauges and fences above the replaced gauge are moved, and they merely move up or down along the board 20 as the case may be. The gauges and fences fit loosely within the polished channels and are easily pushed in either direction. In such adjustments the planner is generally working with the critical-path gauges and is constantly aware of that path. This path may be specially identified by a colored crayon mark on the gauges thereof. The modification of a gauge in any branch does not affect the gauges in the other concurrent branches.

As the work on the program progresses, the graphical chart display 20 of the present invention may be adjusted to account for any differences between the estimated duration of any activity and the actual duration of the activity. Thus, if any particular activity takes a longer or shorter time to carry out than originally estimated, the gauge representing such activity can be replaced with a gauge indicating the actual duration of the activity. With such an adjustment of the display chart 20, the chart then shows any changes in any overall duration of the program so that the planner can always have a clear picture of the actual progress of the program as well as any variations in the estimated duration of the entire program or any parts thereof to be carried out.

With the graphical display device 20 of the present invention, permanent reproductions of the analysis illustrated thereby may be made. One manner of making such permannet reproductions is by photographing the chart display. Another method of making a permanent reproduction of the chart display is by placing a sheet of carbon paper with its carbon surface up over the gauges 30 and fences 36, and placing a sheet of paper over the carbon paper. By pressing a roller or similar instrument over the sheet of paper, the sheet of paper is provided with the impressions of the gauges. Still another manner of making a permanent reproduction of the chart display 20 is by placing a sheet of light sensitive paper over the gauges and fences, and shining a light therethrough. The contrasting brightness and darkness of the board 22 and the gauges 30 provides a reproduction of the gauges and fences on the light sensitive paper.

Such permanent reproductions of the chart display can be made of different condiitons of the display, such as at each time the chart is revised at various stages in the progress of the planning or of the performance of the program. Such permanent reproductions can be used for comparison with previously made reproductions in order to study the progress and trends in the performance of the program, and to provide further adjustments in the future time estimates thereof. Such permanent reproductions also supply data for historical purposes and can be used in analyzing future similar programs to provide, for example, time and cost estimates of related programs. These reproductions effectively provide rectangular graphs, of the programs that are readily analyzed so that repetitive patterns can be detected and understood.

Since the board 22, gauges 30, and fences 38 of the graphical chart display 20 of the present invention are of simple construction, they are inexpensive to manufacture. Also, since the gauges 30 and fences 36 can be easily and quickly assembled on the board 22 to illustrate the analysis of a program, the use of the graphical chart display 20 of the present invention on a time basis compares favorably with the use of any other analytical equipment such as a digital computer or the drawing of graphical representations of the analysis. The graphical chart display 20 of the present invention has advantages in that it can be easily and quickly revised as required or desired by merely manipulating the various gauges and fences. Moreover, it provides direct measurements of the critical path and sub-paths and of the slack times. In addition, complex interrelationships of the program activities can be readily visualized and by making variations in the program, the planner can quickly obtain an appreciation of the alterntives that are available.

In FIGS. 7-9, a modification of a fence for use on the graphical chart 20 of the present invention is generally designated as 56. Fence 56 comprises a thin, rigid plate which may be fabricated of metal or other suitable material. Along the bottom edge of the fence 56 are a plurality of parallel supporting feet 58 which extend in the same direction from the fence and are perpendicular thereto. The feet 58 are each of a width equal to the width of the ribs 26 of the board 22, and are spaced apart a distance equal to the width of the channels 24 in the board. Between the spaced feet are fingers 60 which are in the same plane as the fence 56 and extend downwardly therefrom. Fingers 60 are each of a width slightly less than the width of the channels 24 in the board 22 and of a length slightly less than the depth of the channels. If the fence 56 is made of metal, the feet 58 and fingers 60 may be formed by cutting along parallel spaced lines from the bottom edge of the fence, and bending the alternate tabs so formed upwardly to form the feet 58.

The fence 56 can be used with the board 22 and the gauges 30 in place of the fence 36 shown in FIGS. 1-5, or it can be used with the gauges 61 in FIGS. 7-9. The fence 56 is mounted on the board 22 by inserting the fingers 60 into the channels 24 in the board until the feet 58 are seated on the ribs 26. The feet 58 support the fence 56 in an upright position, and the fence slides easily along the channels of the board. The fence 56 can be placed against the end of one or more gauges 30, and additional gauges seated against the other side of the fence 56. Thus, the fence 56, like the fence 36 of FIG. 3, is used to indicate the events at junction points or nodes.

The gauges 57 are modified and may be used in place of the gauges 30. They have a diamond cross-sectional shape formed by inclined surfaces 59 at the top and bottom surfaces thereof. Thereby, there is less friction at the bottom to impede the sliding of the gauge, and at the top two surfaces are available for carrying more code data and other information. One of the top surfaces may be arranged in the manner described above for the gauge 30. The other top surface is divided lengthwise in blank spaces 61 corresponding to the calibration of the time scale 50. Various numerical data may be inserted in the time scale spaces 61. This data provides a breakdown of the activity and may correspond, for example, to the number of man hours of the activity department during the particular time period, machine time in this period, or the cost in dollars for the activity in the period. This data often varies over the full time of a particular activity; for example, it may start low, increase to a peak, and then decrease. By means of the straight edge 51 and the overall time scale 50 on the board 22, the calibrated spaces of any program time period are examined. That is, those activities occurring concurrently are examined by placing the straight edge 51 across the board, and the information in the pertinent spaces 61 can be summed. For example, all of the man hours of a certain department (indicated by the color code) working concurrently are summed even though they are working in different activities. Likewise, the total machine time occurring concurrently or the total cost of any group or the entire number of concurrent events can be obtained in this manner.

With the adjustability of this device and its ability to provide cost data, it is possible to compare alternative programs on a cost basis to determine the optimum program in cost or time, and the cost expended or saved by variations in time for any part of the program.

The critical path may be visually indicated automatically and electrically by fabricating each of the gauges 30 or 61 with electrical spring contacts 63 (FIG. 2) at their front and rear ends at a certain part thereof, and by mounting electrical indicator elements such as lamps 65 (illustrated schematically) on the top surfaces thereof that are wired between the front and rear contacts 63. When the program assembly on the board is completed with such electrical gauges and with metal fences, such as the fences 56, a power supply such as a battery is connected to the contacts of the beginning and ending gauges 30a and 30g. Thereby, all of the lamps 65 in the gauges of the critical path are automatically lit since a series circuit is completed through the connected contacts of successive gauges and any intervening fences. The lamps in the other slack-branch paths are unlit since the circuits through the latter are broken by the spaces between the gauges. The spring contacts 63 may be recessed in the block to minimize spacing between blocks.

This electrical feature may be extended by using resistor elements in place of, or in addition to, the lamps 65. The resistance of each such element is made proportional to a characteristic of the gauge activity, such as its duration, and the total resistance is summed by means of an ammeter in the series circuit formed by the connected gauges in any path. Thereby, an electrical measurement of the characteristic of the path may be made.

The board of this invention may be small and yet effective to display a large amount of information. For example, fifty channels of ¼ inch width and ¼ inch rib spacing require only 25 inches of width. A length of 20 inches can be used with a basic time calibration unit of, say ¼ or ½ inch. The board may be constructed with a flat rectangular block having strips of ¼ inch wood glued to the top surface and spaced by a ¼ inch to form the channels. The gauges would be slightly less than ¼ inch thick; with some materials they may be much thinner as would be the channels therefor.

In FIGS. 10 and 11, a modified form of the gauge 62 is shown which can be used with the graphical chart display 20 of the present invention. Gauge 62 comprises a U-shaped number of metal or plastic having a pair of spaced, parallel legs 64 extending perpendicularly from the sides of a base 66. The legs 64 are of a length slightly shorter than the depth of the channels 24 in the board 22, and are spaced apart a distance equal to the width of the ribs 26 of the board. The gauges 62 are of various lengths to correspond with the duration of an activity in the manner described above. The top surface 66 of the gauge 62 is flat, and is provided with areas for indicating the particular activity represented by the gauge and the beginning and end events for the activity; alternatively, or in addition, the top surface 66 may have time calibrated spaces similar to the spaces 61 (FIG. 7). The gauge 62 may be used on the board 22 in place of the gauge 30 shown in FIG. 2. As shown in FIGS. 10 and 11, the gauge 62 is mounted on the board 22 by placing it over a rib 26 of the board with the legs 64 extending into the channels 24 in the board and the base 66 seated on the top surface of the rib. The gauge 62 may be used with either of the fences 36 or 56 shown in FIGS. 3 and 7 respectively, and is especially adapted for use with a board (such as that of FIGS. 12–14) in which the bottoms of the channels are open.

In FIGS. 12–15 another modification of the graphical chart display of the present invention is generally designated as 68. Chart display 68 comprises a board, generally designated as 70, which includes a pair of upright end walls 72 (only one of which is shown) connected together in spaced parallel relation by a plurality of spaced, parallel rafters 74. The rafters 74 are of uniform width and are uniformly spaced apart.

Mounted on the board 70 are gauges, generally designated as 76, for indicating the events and activities of the program being analyzed. As shown in FIG. 12, each of the gauges 76 comprises a pair of rectangular collars 78 and 80. The collars 78 and 80 have square holes 82 and 84 respectively therethrough. Links 86 and 88 are pivotally connected to the bottom of the collars 78 and 80, respectively, and extend downwardly therefrom. Links 86 and 88 cross each other adjacent to the bottom ends thereof and are pivotally connected together by a pivot pin 90 (FIG. 15). Short links 92 and 94 are pivotally connected to the bottom ends of the arms 86 and 88, respectively. The bottom ends of the short links 92 and 94 are pivotally connected together by a pivot pin 96. Pivot pins 90 and 96 are provided with heads 98 and 100, respectively, which are in vertical alignment. The head 98 of the pivot pin 90 has a blind hole 102 in its bottom end, and head 100 of pivot pin 96 has a threaded hole 104 extending therethrough. A rod 106 is secured at one end in the blind hole 102 in the head 98 so that the rod 106 can rotate with respect to the head 98, but is prevented from moving longitudinally with respect to the head. Rod 106 has a threaded portion 108 that engages the threaded hole 104 in the head 100 of pivot pin 96. The bottom end 110 of rod 106 is a squared head that is adapted to be received in the squared socket of a key 112 for rotating the rod 106.

The links 86, 88, 92, 94 form a parallel linkage which is effective for moving the collars 82 and 84 together and apart as the rod 106 is rotated by the key 112. When the rod 106 is rotated, the head 100 of the pivot pin 96 is threaded along the rod either toward or away from the head 98 of the pivot pin 90. This movement of the head 100 varies the angle between the arms 86 and 88 so as to vary the distance between the collars 78 and 80.

Secured to the top of the collar 80 is a housing 114 containing a flexible tape 116 having a linear scale on the outer surface thereof. The tape 116 is wound on a spring retracted reel, not shown. The spring retracted reel within the housing 114 may be of any construction well known in the art. An upright plate 118 is mounted on the top of the collar 78. The free end of the tape 116 is secured by a suitable fastener to the plate 118.

Gauge 76 is mounted on the board 70 by inserting the gauge between a pair of rafters 74 with the collars 78 and 80 of the gauge projecting above the top surfaces of the rafters. Separate elongated rods 120 and 122 are inserted through the holes 82 and 84 in the collars 78 and 80, and are seated across the top surfaces of the rafters 74. Thus, the rods 120 and 122 support the gauge 76 on the rafter 74 of the board 70. When mounted on the board 70, the tape 116 of the gauge 76 represents an activity, and the collars 78 and 80 represent the beginning and end events of the activity. The exposed length of the tape 116 represents the duration of the activity. As shown in FIG. 14, the top surface of the tape 116 may be provided with indicia to show the duration of the activity. Since the tape 116 is wound on a spring retractable reel, the amount of tape exposed can be easily adjusted to indicate an activity of a desired duration by moving the collars 78 and 80 either closer together or further apart. This adjustment is achieved by rotating the rod 106 of the gauge 76 by means of the key 112.

In the use of the graphical chart display 68, to illustrate the analysis and scheduling of a program, the gauges 76 are mounted on the board 70 by means of rods, such as the rods 120 and 122, in the same manner as previously described with regard to the chart display 20 of FIG. 1. Where a plurality of parallel gauges are supported by a rod (such as the rod 122), that rod is a node or fence in the manner described above. As the program progresses, the display device 68 can be adjusted to show any differences between the actual duration and the estimated duration of any activity by adjusting the exposed length of the tape 116 representing such activity in the manner previously described. Instead of manually operating the rod 106 of the gauge 76 by means of the key 112, an electric motor can be connected to the rod 106 so that the gauge 76 can be adjusted remotely through a switch.

The tape surface may be arranged with areas to receive code data of the type described above for gauges 30 and 61.

The present invention may be embodied in other specific forms without departing from the spirit or essential attributes thereof.

The present invention provides a new and improved chart display for analyzing and scheduling programs of various types. The device and system of this invention is especially adapted to provide a graphical display of the critical path of the program as well as of slack branches thereof together with measurements of the characteristics thereof. The device is readily adjustable and adaptable to display modifications of a program as well as the actual performance thereof. Small programs can be displayed as well as large ones involving hundreds of activities. Moreover, by connecting a plurality of boards together to make a larger board, a thousand or more activities in a program can be displayed and analyzed.

What is claimed is:

1. A graphical chart display for the critical path of a scheduled program comprising a plurality of gauge elements of different lengths for representing the time durations of activities of the program, said gauge elements being positioned in a plurality of series paths and in a plurality of parallel paths parallel to a certain axis, a plurality of nodal elements positioned across said parallel paths perpendicular to the axis and at the starting ends of the gauge elements in the parallel paths to provide junction indications thereof, and means providing a time scale along said axis, whereby the critical path is indicated to be along the path of gauge elements extending from one nodal element to the next.

2. A graphical chart display in accordance with claim 1 in which said gauge elements are of various fixed lengths to correspond to the duration of the activities.

3. A graphical chart display in accordance with claim 1 in which said gauge elements are of variable length to permit adjustment of the duration representation.

4. A graphical chart display in accordance with claim 1 in which said gauge elements and said nodal elements are removably and slidably mounted to permit adjustment of the relation thereof.

5. A graphical chart display as recited in claim 1 wherein said gauge elements include a time scale similar to said parallel axis time scale, whereby the time scale of said gauges may be referenced to the time scale of said parallel path.

6. A graphical chart display as recited in claim 5 wherein said gauge time scale includes means for providing information characteristic of the activity associated with the gauge element, whereby said characteristic information at any time of said program may be derived for a plurality of parallel gauge elements.

7. A graphical chart display for illustrating the analysis of a program comprising a board having a plurality of spaced, parallel supporting elements, a plurality of gauges adapted to be mounted on said supporting elements, said gauges representing the various activities of the program and being adapted to be arranged on said board in various series and parallel relations according to the sequence of the activities in carrying out the program, and a plurality of fences adapted to be mounted across the supporting elements of said board at the junction points of the parallel related gauges, said supporting elements being channels formed by spaced parallel ribs, each of the gauges comprising a rectangular block insertable in said channels and having a mounting portion of a width slightly less than the width of the channels in the board, and said block having a height greater than the depth of the channels, said gauges being mounted on the board within the channels.

8. A graphical chart display as recited in claim 7 wherein said fences are plates adapted to be positioned between the ends of a plurality of parallel gauges and the end of a preceding gauge.

9. A graphical chart display for the critical path of a scheduled program comprising a plurality of gauge elements of different lengths each having electrical contact means at the ends thereof and circuit means connected therebetween, means for positioning a plurality of said gauge elements end to end in a series path and a plurality thereof in parallel paths of different lengths, and means for connecting a contact of the end one of said series path gauge elements to contacts of said parallel gauge elements and a contact of a gauge element in the longest one of said parallel paths to contacts of another plurality of said gauge elements in parallel paths to form a series electrical circuit via the longest ones of said parallel paths and said series path.

10. A graphical chart device for displaying the longest path and interrelationships of a program and for manipulatively analyzing the program, said device comprising a plurality of gauge elements of lengths representative of characteristics of interrelated activities of the program, means providing a plurality of parallel paths parallel to a certain axis, said gauge elements being selectively and adjustably positionable in different series lengths along said parallel paths to form a plurality of networks each composed of a plurality of said gauge elements in a plurality of said paths, and means for intercoupling gauge elements in parallel paths to coordinate the adjustment thereof and for indicating the beginning and end of each of said networks, said intercoupling and indicating means including a plurality of nodal elements selectively positionable at the ends of selected gauge elements and across selected ones of said paths perpendicular to said axis, whereby the longest path is indicated to be along the path of gauge elements extending from one nodal element to the next.

11. A graphical chart device for displaying and analyzing the longest path and the interrelationships of a program involving a plurality of activities having series and parallel relationships, said device comprising means providing a plurality of parallel paths, and a plurality of means for adjustably representing in series and parallel form said interrelationships and including a plurality of gauge elements of length representative of characteristics of said activities and selectively positionable in series along said paths, and a plurality of linear nodal elements positionable at right angles to desired ones of said parallel paths and selectively to less than all thereof to indicate in a transverse linear fashion the beginning and end of each of a plurality of series and parallel networks each generally composed of a plurality of gauge elements in a plurality of parallel paths, with the end nodal elements of the networks forming the beginning nodal elements of succeeding networks, the number of said parallel paths being sufficient to selectively establish a plurality of said networks in parallel, whereby the nodal elements establish the interrelationships of a plurality of parallel and series networks and a longest path is indicated to be along the path of gauge elements extending from one nodal element to the next.

12. A graphical chart device as recited in claim 11 wherein said gauge elements in any of said networks and in said longest path are retained in relative position by the associated nodal elements and any element not in said longest path is movably adjustable within its path between the associated nodal elements and relative to parallel gauge elements.

13. A graphical chart device as recited in claim 12 wherein said parallel path means and said gauge elements have scales therealong related to the lengths of said gauge elements, said gauge scale of each gauge element including means for providing information characteristic of the activity associated therewith, and further comprising means providing a straightedge to relate the scales of said gauge elements and said parallel path means to each other, whereby said characteristic information at any point along said parallel path scale may be derived for a plurality of parallel gauge elements.

14. A graphical chart device as recited in claim 11 wherein said means providing parallel paths includes a member having a plurality of spaced parallel ribs having upper surfaces extending in a plane, said gauge elements are blocks each dimensioned to be slidable within channels between said ribs and to have an upper surface extending above said ribs and transversely to the plane thereof.

15. A graphical chart device as recited in claim 14 wherein said member has means for connecting to a similar member to provide an enlarged display.

References Cited in the file of this patent

UNITED STATES PATENTS

| | | |
|---|---|---|
| 2,234,248 | Hanford | Mar. 11, 1941 |
| 2,649,790 | Johnson | Aug. 25, 1953 |
| 2,884,713 | Campbell | May 5, 1959 |

FOREIGN PATENTS

| | | |
|---|---|---|
| 449,015 | Great Britain | June 15, 1936 |